United States Patent [19]

Blackburn

[11] 4,276,998
[45] Jul. 7, 1981

[54] METER-CONTROLLED BRAKING SYSTEM FOR A FLUID-DELIVERING VEHICLE

[76] Inventor: Eugene L. Blackburn, 7136 Chamberlayne Rd., Mechanicsville, Va. 23111

[21] Appl. No.: 97,244

[22] Filed: Nov. 26, 1979

Related U.S. Application Data

[63] Continuation-in-part of Ser. No. 16,667, Mar. 1, 1979, abandoned.

[51] Int. Cl.³ .............................................. B67D 5/24
[52] U.S. Cl. ...................................... 222/30; 222/52; 222/626; 188/170
[58] Field of Search .............................. 188/170–171, 188/106 F; 222/23, 30, 36, 52, 608, 626, 627; 137/560

[56] References Cited

U.S. PATENT DOCUMENTS 2,707,577  5/1955  Trotter et al. .......................... 222/30
2,946,485  7/1960  Durner .................................... 222/30

*Primary Examiner*—H. Grant Skaggs
*Attorney, Agent, or Firm*—Norman B. Rainer

[57] ABSTRACT

A system is provided for preventing movement of a fluid-delivering vehicle during transfer of fluid such as fuel oil from said vehicle. The system utilizes a modified conventional recording meter assembly to alter the flow of electrical current in an electrical circuit which activates a solenoid valve to control pneumatic pressure transmitted to brake control assemblies utilizing a power spring in association with a pressure-displaceable diaphram.

4 Claims, 6 Drawing Figures

METER-CONTROLLED BRAKING SYSTEM FOR A FLUID-DELIVERING VEHICLE

BACKGROUND OF THE INVENTION

This invention is a continuation-in-part of application Ser. No. 016,667, filed Mar. 1, 1979 by the same inventor and now abandoned.

FIELD OF THE INVENTION

This invention relates in general to a fuel dispensing system for use by a vehicle such as a truck which carries a cargo of liquid fuel and utilizes a metering device to record the delivery of said fuel.

DESCRIPTION OF THE PRIOR ART

Trucks which carry liquid fuel from a central depot in order to deliver said fuel for sale to different customers at different locations are generally equipped with a metering device mechanically associated with a printer-register device which imprints on a sales slip or card the volume of fuel dispensed together with other information pertinent to the delivery which may include the serial number of the sales slip, the date, and the identity of the customer. The sales slip is generally supported on a tray component of the printer-register device, and is laterally displaceable between different positions relative to said printer-register by mechanical means coupled to a manually rotatable crank mechanism.

At the start of a delivery of fuel, the driver activates a pump, and inserts a sales slip into said tray in its first or starting position. Initial operation of the crank causes deployment of a retaining means which secures the sales slip within said tray in a manner preventing its removal without tearing, the usual embodiment of said retaining means being a pin which penetrates the sales slip. Substantially concurrently with the deployment of the retaining means, printing means on said printer-register may be activated to imprint onto the sales slip a record of the initial reading of the register coupled to the meter, said reading corresponding to the start of said delivery. Further rotation of said crank displaces the tray to a second or delivery position. While the tray is in said second position, fuel is transferred from said cargo tank, through a transfer pump, through a positive displacement meter coupled to said printer register, through a hose terminating in a discharge nozzle manually controlled by the driver, and finally into a customer's storage facility.

To conclude the fuel delivery, the discharge nozzle is closed, the crank is further rotated, causing imprinting of the sales slip with data corresponding to the total volume of fuel delivered, then causing return of the tray to its first or starting position. The reason for the two separate tray positions is to enable the printing mechanism to imprint the sales slip on two separate lines, one above the other. As a final aspect of the fuel delivery transaction, the crank is further rotated, causing release of the retaining means to permit removal of the sales slip from the tray, and restoring the various functional components of the printer-register to the starting condition of the cycle.

The several stages of the aforementioned sequence are synchronously automated by mechanical and/or electrical means functionally coupled to said crank mechanism. The various components involved in recording the delivery of fuel are installed on said vehicle in a manner such that substantially only the crank lever and tray are readily accessible to the driver of the vehicle.

It has been found desirable, from the standpoint of safety, to ensure that the brakes of the truck are set during the fuel pumping interval. Another reason however, for immobilizing the truck during the delivery of fuel is to prevent the driver of the truck from cheating on the volume of fuel delivered to a given customer. Such cheating could be achieved by the driver by inserting a sales slip into the meter, delivering a certain amount of fuel, then without removing the sales slip from the tray, driving the truck to a second location, pumping more fuel, and removing the sales slip. In this manner, the second customer would be billed for not only the fuel he received but also for the fuel delivered to the prior customer.

Various expedients have been disclosed for immobilizing a fuel truck during a delivery for the purposes of promoting safety and preventing cheating. The system disclosed in U.S. Pat. No. 2,946,485 to Durner utilizes a manually operated lever associated with a meter to activate the pump that delivers the fuel and simultaneously control a vacuum line system that sets the brakes. The Durner system thus requires separate manipulations of the lever after insertion of the sales slip to achieve the sought results. It should also be noted that, whereas the Durner system is dependent upon the use of a vehicle equipped with a vacuum line system, most modern trucks are not so equipped.

U.S. Pat. No. 2,707,577 to Trotter et al, also discloses a system for braking a fuel delivery vehicle during a sales transaction by utilizing a valve associated with a meter to control a vacuum line system. In the Trotter et al system, a manually operated crank on the meter locks a sales slip in place and simultaneously controls a vacuum line system which in turn controls the brakes of the vehicle.

The aforementioned and other prior art disclosures generally require specially constructed meters, or involve non-automatic operation, or are not applicable to modern braking systems, or suffer still other shortcomings. Most presently utilized braking systems are based on pneumatic principles of operation wherein a compressor delivers air at pressures of about 20 to 100 psi to brake control assemblies associated with the brakeshoes of at least two laterally paired wheels of the vehicle. The control assemblies are provided with a spring which urges the brakeshoes into braking effect. A diaphram associated with said spring is adapted to counteract the effect of the spring when suitable pressure is applied to the diaphram, and thereby release the brakes.

It is an object of the present invention to provide a system for preventing movement of a fuel oil delivery vehicle while fuel oil is being transferred out of said vehicle, said movement being prevented by the engagement of the brakes of said vehicle in response to control signals provided by a recording meter assembly.

It is a further object to provide a system of the aforementioned nature wherein said vehicle does not possess a vacuum line system for brake control.

It is another object to provide a system of the aforementioned nature which utilizes a recording meter assembly of substantially standard contruction in a substantially automatic mode of operation.

It is a still further object of the present invention to provide a system of the aforementioned nature wherein said brakes are based upon a pneumatic principle of operation which employs control assemblies having a spring to effect braking action and a diaphram mechanism adapted to counter the effect of said spring.

SUMMARY OF THE INVENTION

The system of the present invention utilizes a recording meter assembly comprising a printer-register mechanically coupled to a meter which measures volumetric throughput. The printer-register contains a tray adapted to carry a sales slip and adapted to be moved by a manually-operated crank mechanism to different positions within said printer-register. The printer-register and the meter are of standard design.

In accordance with the present invention, an electrical switch is installed in said printer-register in a manner such that the tray, when in a position corresponding to the transfer of fuel, causes said switch to alter the flow of electrical current in an electrical circuit drawing current from the vehicle's electrical system. Said electrical circuit includes a solenoid-operated valve which controls the transmission of high pneumatic pressure from a compressed air system of conventional design. During a fuel delivery transaction, the functional mode of said switch and the attendant nature of electrical flow in said circuit directs said solenoid valve to transmit high pneumatic pressure to an air control valve.

When said air control valve is thus activated, it functions to discontinue application of pressurized air to brake control assemblies of conventional design, thereby causing springs in said brake control assemblies to effect braking of the vehicle.

When the tray is moved to a position corresponding to cessation of fuel delivery, said switch causes said solenoid valve to discontinue transmission of high pneumatic pressure to said air control valve. The consequence of such effect is to cause said air control valve to redirect high pressure air to said brake control assemblies, causing release of the braking effect.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
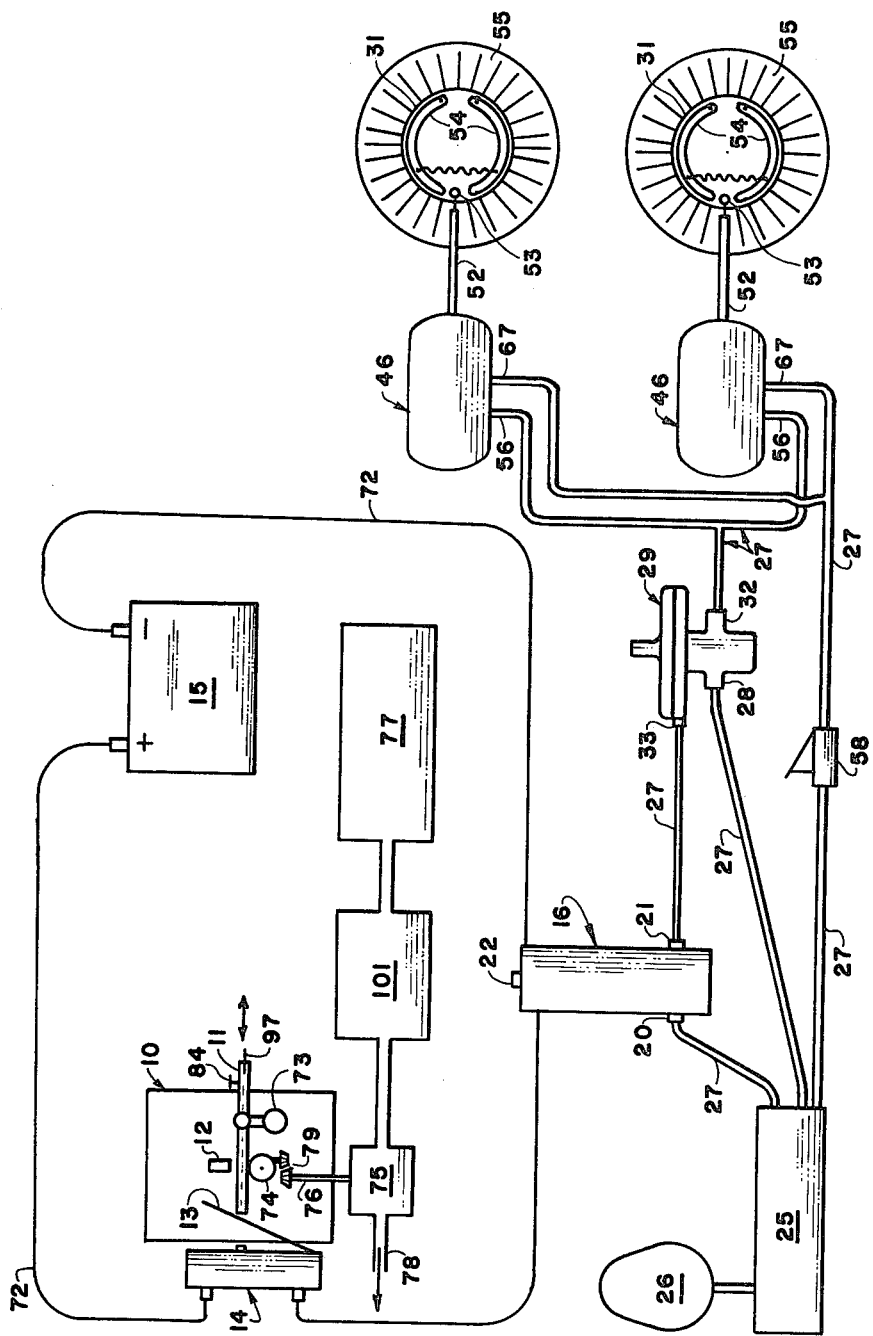
FIG. 1 is a schematic representation of the component parts of the system of the present invention showing their functional inter-relationships.

Referring to FIG. 1, an embodiment of the system of the present invention is shown comprising a printer-register 10 represented in a schematic outline side view. The printer-register has a tray 11 transversely positionable between innermost and outermost locations relative to said printer-register by the action of crank mechanism 73. In the course of the back and forth travel of said tray, a printing head 12 is automatically caused to strike a sales slip 97 carried within said tray, causing said slip to become imprinted with numerical and other data disposed in the upward position of the underlying rotary counter mechanism 74.

In the exemplified embodiment of the printer-register 10, the shown outermost position of tray 11 is associated with a state of the system ready for the recorded delivery of fuel. In said state, hereinafter to be referred to as the delivery state, fuel may be transferred from cargo tank 77 through pump 101, through meter 75 to exit port 78. A flexible hose conduit (not shown) is attached to exit port 78, and terminates in a manually operated dispensing nozzle of conventional design. The several enumerated components involved in the transfer of fuel are readily available components of standard manufacture. Meter 75, generally containing positive-displacement means, is coupled to rotary counter mechanism 74 through mechanical linkage 76 and bevel gears 79, thereby recording or registering the volume of fuel delivered.

A particularly suitable commercial embodiment of pump 101 is Marlow Model 2MB3G, made by I.T.T. Corp., Midlandpark, N.J.

A particularly suitable commercial embodiment of meter 75 is model M-30, supplied by the Liquid Controls Corp., of Chicago, Ill. and described in their Bulletin No. 103, printed in 1976.

A particularly suitable commercial embodiment of printer-register 10 is model 788800 made by the Veeder-Root Corp. of Hartford, Conn., and described in their Manual No. 251322, printed in 1977.

An electrical switch 14 provided with control lever 13 is mounted adjacent the rear of printer-register 10. The embodiment of said electrical switch utilized in the system of FIG. 1 is designed to have a normally closed circuit. When lever 13 is depressed, the switch is then made to have an open circuit, namely a condition which causes discontinuation of flow of electricity. Details of construction of switch 14 are presented in FIGS. 5 and 6.

When tray 11 is in its outermost position, corresponding to the aforementioned state of fuel delivery, the closed electrical configuration of switch 14 causes electrical current, drawn from the vehicle's electrical system represented by storage battery 15, to flow in circuit 72. When tray 11 is in its innermost position, it depresses lever 13, thereby causing discontinuance of flow of electricity in circuit 72, and representing a state of the system, as will hereinafter be shown, wherein fuel cannot be pumped in a manner to be properly recorded on printer-register 10, said state to be referred to hereinafter as the non-delivery state.

Figure 5:
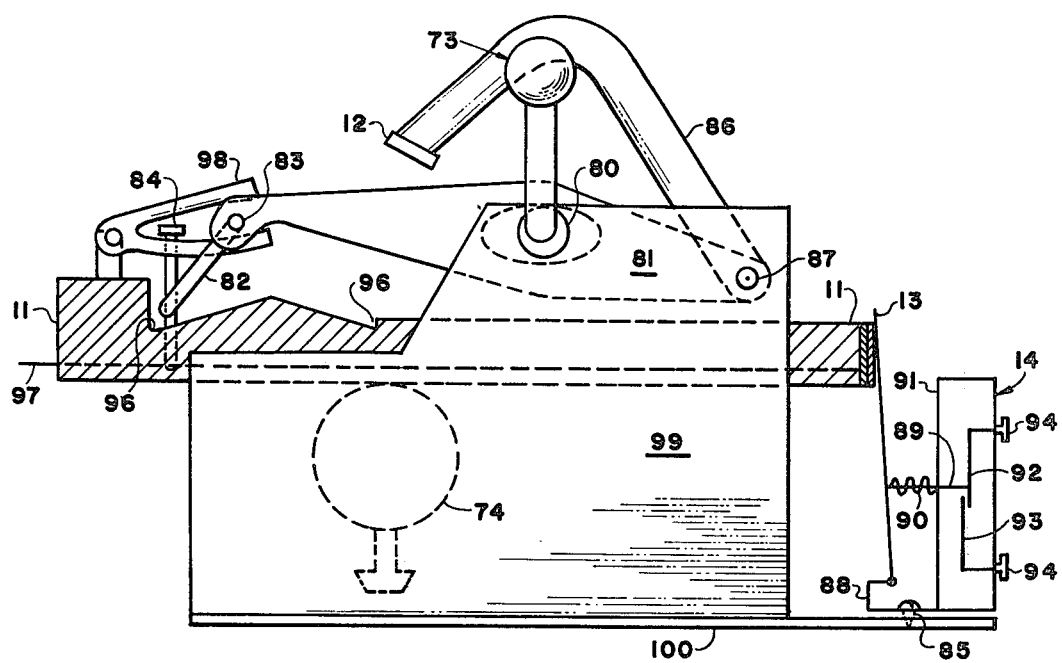
FIG. 5 is an enlarged side view of a conventional printer-register corresponding to the printer-register schematically represented in FIG. 1.
Figure 6:
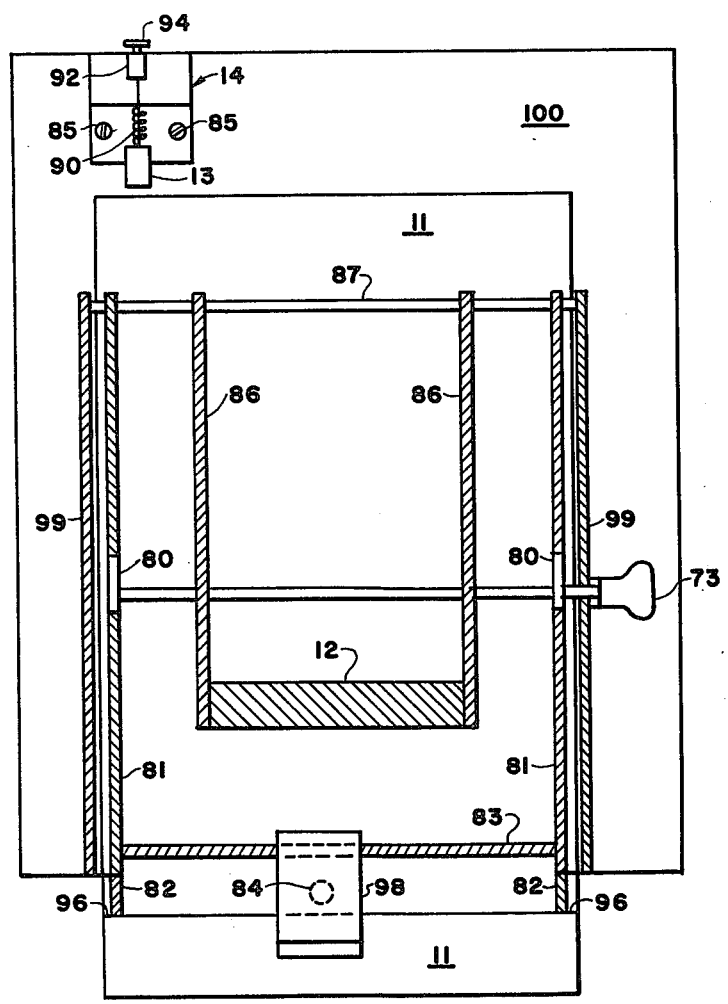
FIG. 6 is a top view of the printer-register of FIG. 5.

Referring to FIGS. 5 and 6, crank 73 supported by sidewall 99 of printer-register 10 drives eccentrically mounted cams 80 engaging eliptical holes in paired flat beams 81, whereby rotation of said crank causes up and down displacement of said beams. Arms 82, pivotally mounted to the forward ends of beams 81 are adapted to engage abutment notches 96 in the upper surface of tray 11, thereby propelling said tray in back-and-forth horizontal traversal of the meter. Front cross rod 83, journalled to beams 81, is adapted to engage bifurcated holder 98 which raises and lowers pin 84 carried by tray 11. A printing head 12, transversely disposed between beams 81 is attached by extension arms 86 to pivot bar 87 journalled to sidewalls 99. In the course of the back and forth transversal of tray 11, said printing head 12 is caused to cyclically impact upon sales slip 97, causing imprinting by the underlying counter rolls 74.

The electrical switch 14 is attached to the base 100 of printer-register 10 in a manner to be physically contacted by tray 11. In the mode of placement shown in FIGS. 5 and 6, bolts 85 attach switch 14 to the rear of the meter in a manner to be contacted by tray 11 in its rearward or innermost position, corresponding to the non-delivery state of the system. Control lever 13 is pivotably connected to the frame 88 of said switch. Rearward motion of said lever drives a dielectric pin 89 housed within restoring spring 90 through an orifice in stationary wall 91 into displacing abutment with spring contact 92, thereby causing contact 92 to separate from coacting contact 93 and breaking electrical continuity to terminals 94 which connect with circuit 72. Forward motion of lever 13 re-establishes electrical continuity, thereby causing current to flow in circuit 72.

Figure 4:
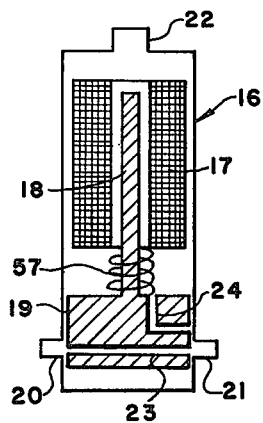
FIG. 4 is an enlarged transverse sectional view of the solenoid valve of the system of FIG. 1.

Changes of current flow in electrical circuit 72 energize solenoid valve 16. The embodiment of said solenoid valve shown in FIG. 4 is comprised of electromagnetic coil 17, plunger core 18 which supports valve block 19, spring 57 which urges said valve means downwardly from said coil, inlet port 20, outlet port 21 and vent port 22. When electrical current flows through coil 17, plunger core 18 and attached valve means 19 are drawn upward by the action of coil 17. Valve block 19, shown in its upward position in FIG. 4, places passageway 23 in communication with inlet port 20 and outlet port 21. Passageway 24 is adapted to communicate with outlet port 21 and the space communicating with vent port 22 when no electrical current flows in coil 17 and said valve means is displaced by spring 57 to its downward position. Said solenoid valve 16 is of generally standard construction. A suitable embodiment which may be utilized in the practice of this invention is model MA-4 made by the Skinner Electric Valve Division, New Britain, Conn.

Other types of solenoid valves may however be utilized. Although each is characterized by the functional presence of an electromagnetic coil and associated core adapted for motion within said coil, several modifications are common. For example, if a spring is present to counteract the motion of the core, the spring may be adapted to operate in either contractive or expansive modes applied to either end of said core, thereby causing various positioning effects of the core depending upon the electrical activation of the coil. Some solenoid valves may have no restorative springs and rely instead upon reversal of electrical current flow to restore the position of the core. The actual valve seating means may be associated wither with the core itself or with other mechanical means associated with said core.

Attendant with the flow of electricity in circuit 72 when the system is in its delivery state, a signal light may also be caused to glow and remain aglow as a reminder to the driver throughout the period of time that fuel oil is being pumped from the vehicle.

A reservoir 25 containing high pressure air supplied by compressor 26 is connected by means of pressure-resistant tubing 27 to (A) the inlet port 20 of solenoid valve 16, (B) the upstream port 28 of air control valve 29, and (C) the service brake system of the vehicle represented by pedal control means 58 which directs air to brake control assembly 46.

Figure 2:
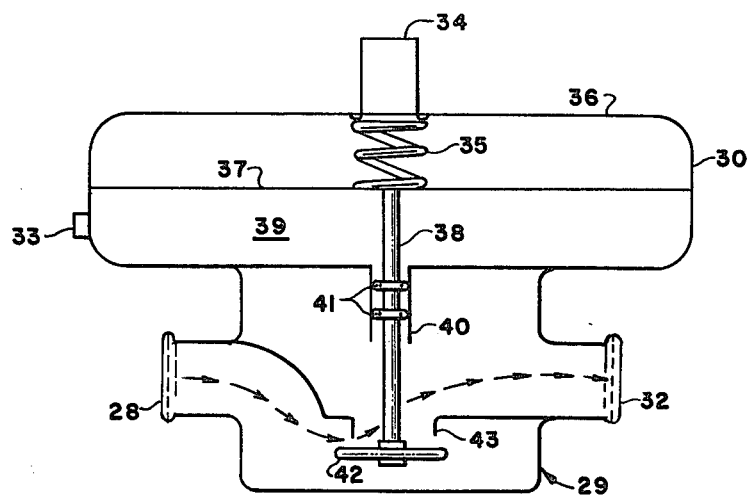
FIG. 2 is an enlarged transverse sectional view of the air control valve of the system of FIG. 1.

As shown more clearly in FIG. 2, air control valve 29 is comprised of an outer housing 30 having upstream port 28, downstream port 32, control port 33, and vent opening 34. Upper coil spring 35 is disposed between upper wall 36 and flexible diaphram 37. Valve stem 38, attached to the underside of diaphram 37 extends vertically through chamber 39, exiting through close-fitting sleeve 40 equipped with sealing O-rings 41. Attached to the bottom extremity of stem 38 is a flat circular valve head 42 adapted to fit against depending circular valve seat 43.

The air control valve is of standard design. A suitable specific embodiment which may be utilized in the practice of the present invention is control valve model WM 147 F, manufactured by the Williams Air Controls Company of Portland, Oreg. In its utilization in the present invention, upstream port 28 is connected by tubing 27 to reservoir 25 containing air under high pressure. Downstream port 32 is connected by said tubing to brake control assemblies 46. Control port 33 communicates via tubing 27 with outlet port 21 of solenoid valve 16.

Figure 3:
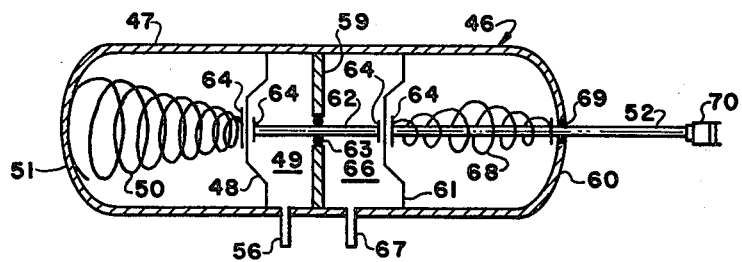
FIG. 3 is an enlarged transverse sectional view of the brake control assembly of the system of FIG. 1.

Brake control assembly 46, as shown in FIG. 3, is comprised of outer housing 47 provided with internal divider plate 59 positioned between diaphrams 48 and 61, a power spring 50 extending between diaphram 48 and rear wall 51 of said housing, a push rod 52 engaging diaphram 61 and emerging through front wall 60, and force transmitting rod 62 which passes through air-tight O-ring 63 in plate 59 and attaches at each end to contact plates 64 adapted for abutment with said diaphrams. Diaphram 48, plate 59 and the intervening portion of outer housing 47 define an air chamber 49 having access port 56. Diaphram 61, plate 59 and the intervening portion of outer housing 47 define an air chamber 66 having access port 67. The inner end of push rod 52 is provided with contact plate 64 for contacting diaphram 61. A return spring 68, mounted on push rod 52 within the housing 47, extends between contact plate 64 and front wall 60. Said push rod extends through alignment bushing 69 in housing 47, and terminates in clevis 70. Said clevis is adapted to cause activation of a cam 53 capable of causing brakeshoes 54 to engage brakedrum 31 on the wheel upon which tire 55 is mounted.

The brake control assembly 46 is of standard design and is associated with at least the rear wheels of the vehicle. Suitable specific embodiments of brake control assembly which may be utilized in the practice of this invention include Spring Brake model SB-3 manufactured by the Bendix Co., of Southfield, Mich., and Model 2024 manufactured by the Anchorlok Division of Royal Industries, of Compton, Calif.

The operation of the system of the present invention is initiated when the driver of the vehicle places a sales slip in tray 11, initially in an inward disposition, and turns crank lever 73, thereby causing the tray to move toward the front of printer-register 10 and additionally causing the sequence of effects described hereinabove. As lever 13 of switch 14 is thereby released by tray 11, electrical current will flow in circuit 72. Such change in the electrical mode of circuit 72 causes plunger core 18 and connected valve block 19 to be moved upward. Said upward position of valve block 19 causes high pneumatic pressure from reservoir 25 to be transmitted through inlet port 20, passageway 23, outlet port 21, and control port 33 into chamber 39 of air control valve 29.

The pressure in chamber 39 displaces diaphram 37 upwardly, causing valve head 42 to rise into sealing engagement with valve seat 43, and thereby preventing high pneumatic pressure from being transmitted to air chamber 49 of brake control assembly 46. In its depressurized state, chamber 49 enables diaphram 48 to be displaced toward said chamber under the force of power spring 50, causing force transmitting rod 62 to displace diaphram 61 which urges push rod 52 forward. This motion of push rod 52, acting upon cam 53, causes brakeshoes 54 to engage brake drum 31, thereby preventing movement of the vehicle.

When the delivery of fuel oil from the vehicle is completed, the driver cranks tray 11 to its inward disposition. This action depresses control lever 13 of electrical switch 14 thereby discontinuing electrical flow in circuit 72. Simultaneously therewith, printer 12 is caused to imprint the sales slip with data recording termination of the delivery transaction. As a consequence of the discontinuation of electrical current to coil 17 of solenoid valve 16, block 19 moves downward, thereby disconnecting the supply of pressure to control port 33 of air control valve 29 and causing passageway 24 to mate with outlet port 21, thereby permitting the pressure within chamber 39 to vent to the atmosphere through passageway 24 and vent port 22 of solenoid valve 16. The loss of pressure in chamber 39 causes valve stem 38 and affixed valve head 42 to be driven downward by spring 35, thereby re-establishing transmission of air pressure from downstream port 32 of air control valve 29 to chamber 49 of brake control assembly 46. In its pressurized state, chamber 49 drives diaphram 48 toward rear wall 51, permitting restoring spring 68 to drive push rod 52 in the same direction. This motion of said push rod, acting upon cam 53, causes brakeshoes 54 to disengage from brake drum 31 thereby permitting rolling movement of said vehicle, depending upon the control action of the vehicle's service brake system operated through pedal control means 58.

Whereas the meter-controlled braking system of this invention causes the brakes to be applied when pressure to the brake control assembly is discontinued, the opposite effect is produced with the vehicle's service brake system. This effect may be better understood by reference to FIGS. 1 and 3, wherein depression of brake pedal 58 causes transmission of air pressure from reservoir 25 to chamber 66 of brake control assembly 46. The high pressure in chamber 66 displaces diaphram 61 forward in the direction of front wall 60, causing forward movement of push rod 52 and attendant engagement of brake shoes 54 with brake drum 31.

While particular examples of the present invention have been shown and described, it is apparent that changes and modifications may be made therein without departing from the invention in its broadest aspects. The aim of the appended claims, therefore is to cover all such changes and modifications as may fall within the true spirit and scope of the invention.

Having thus described my invention, what is claimed is:

1. In an automotive vehicle designed for the transportation and delivery of fluid fuel provided with an electrical system, a pedal-controlled service brake system utilizing pressurized air, and a recording meter assembly for recording the volume of fuel delivered from said vehicle, said assembly having a tray for supporting a sales slip, said tray being sequentially and cylically moveable between a first position wherein said assembly is not functionally disposed to properly record the volume of fuel delivered, and a second position wherein said assembly is functionally disposed to properly record the volume of fuel delivered, and means mechanically coupled to said tray for imprinting data on said sales slip corresponding to the status of said assembly prior to and subsequent to said delivery of fuel, an improved braking system comprising:

(a) an electric switch associated with said assembly in a manner adapted to establish a first mode of flow of electrical current in a circuit connected to said electrical system when said tray is in said first position, and adapted to establish a second mode of flow of electrical current in said circuit when said tray is in said second position, (b) a solenoid-controlled valve electrically connected to said circuit and adapted to transmit air pressure from an upstream high pressure reservoir to downstream components when said circuit is in said second mode, and adapted to discontinue transmission of air pressure and to release downstream pressure when said circuit is in said first mode, (c) an air control valve having a first chamber which receives air pressure transmitted from said solenoid valve and is bounded in part by a first pressure-displaceable diaphram having associated valve means, an upstream port communicating with said high pressure reservoir, and a downstream port adapted to transmit air from said upstream port, whereby high pressure within said first chamber causes said valve means to interrupt flow between upstream and downstream ports, and (d) at least one pair of brake control assemblies, each of said assemblies being comprised of an outer housing confining a second chamber bounded in part by a second pressure-displaceable diaphram which engages a coiled power spring, and a third chamber bounded in part by a third pressure-displaceable diaphram which engages a push rod extending out of said housing and connected to means which apply braking action to a wheel of said vehicle when said push rod is displaced away from said housing, said second chamber communicating with the downstream port of said air control valve, said third chamber communicating with said pedal-controlled service brake system, and force transmitting means interactively disposed between said second and third diaphrams, whereby high pressure air supplied to said second chamber causes said push rod to move into said housing and removal of said high pressure from said second chamber causes said push rod to be displaced away from said housing, the opposite responses of the push rod to pressure being produced by said third chamber.

2. The improved braking system of claim 1 wherein said second and third diaphrams, power spring and push rod of said brake control assembly are in coaxial alignment.

3. The improved braking system of claim 2 wherein said tray contains means for penetrating said sales slip while said tray is in its second position, said penetrating means disengaging from said sales slip when said tray is in its first position, whereby said sales slip cannot be removed from said meter without tearing during a delivery of fuel from said vehicle.

4. The improved braking system of claim 3 wherein said recording meter assembly is comprised of a printer-register device mechanically coupled to a meter device, said printer-register device accommodating said tray and having a crank mechanism for moving said tray and activating said means for penetrating said sales slip.

* * * * *